United States Patent
Kuo (10) Patent No.: US 11,163,355 B2
(45) Date of Patent: Nov. 2, 2021

(54) COMMUNICATION APPARATUS HAVING POWER SAVING MODE AND CAPABLE OF SAVING MORE POWER IN POWER SAVING MODE

(71) Applicant: Realtek Semiconductor Corp., HsinChu (TW)

(72) Inventor: Chun-Wei Kuo, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/860,081

(22) Filed: Apr. 28, 2020

(65) Prior Publication Data

US 2021/0149475 A1     May 20, 2021

(30) Foreign Application Priority Data

Nov. 20, 2019   (TW) .................. 108142055

(51) Int. Cl.
*G06F 1/3234* (2019.01)
*G06F 13/28* (2006.01)
*G06F 1/3287* (2019.01)

(52) U.S. Cl.
CPC .......... *G06F 1/3275* (2013.01); *G06F 1/3287* (2013.01); *G06F 13/28* (2013.01)

(58) Field of Classification Search
CPC ...... Y02D 10/00; Y02D 30/50; G06F 3/0688; G06F 13/00; G06F 12/023; G06F 12/0238; G06F 12/0246; G06F 1/3203; G06F 1/3287; G06F 2212/205; G06F 3/0625; G06F 3/0659; G06F 13/40; G06F 13/4221; G06F 12/0638; G06F 1/3275; G06F 2212/202; G06F 9/4418; G06F 1/32; G06F 1/3206; G06F 1/3212; G06F 1/3237; G06F 1/324; G06F 1/3268; G06F 1/3278; G06F 1/3296; G06F 21/81
USPC ........................ 713/323, 322, 300, 320, 340
See application file for complete search history.

(56) References Cited

U.S. PATENT DOCUMENTS

| | | | |
|---|---|---|---|
| 9,510,289 B1* | 11/2016 | de Ruijter | H03L 7/148 |
| 2009/0059828 A1* | 3/2009 | Kubo | H04L 12/12 370/311 |
| 2010/0325457 A1* | 12/2010 | Lachwani | G06F 1/3237 713/323 |
| 2014/0003145 A1* | 1/2014 | Akers | G06F 3/0655 365/185.08 |

(Continued)

*Primary Examiner* — Faisal M Zaman
(74) *Attorney, Agent, or Firm* — Winston Hsu (57) ABSTRACT

A communication apparatus having power saving mode includes memory circuit unit and DMA module. The memory circuit unit is used for storing instruction and data information to be executed by microcontroller (or control circuit) of communication apparatus, and the DMA module is used to backup the instruction and data information and store such information into a memory of an electronic device when the communication apparatus receives a broadcast synchronization signal periodically sent from another communication device. During the power saving mode, the memory circuit unit is powered down. When leaving the power saving mode, the memory circuit unit is powered on, and the DMA module retrieves the instruction and data information from the memory of the electronic device and write such information into the memory circuit unit.

14 Claims, 6 Drawing Sheets

(56) References Cited

U.S. PATENT DOCUMENTS

| | | | |
|---|---|---|---|
| 2014/0013045 A1* | 1/2014 | Crossland | G11C 14/0036 711/105 |
| 2014/0013148 A1* | 1/2014 | Shimizuno | G06F 1/12 713/375 |
| 2014/0181558 A1* | 6/2014 | Taha | G06F 12/0238 713/323 |
| 2015/0281875 A1* | 10/2015 | Shin | H04W 4/80 455/41.2 |
| 2017/0083454 A1* | 3/2017 | Ramalingam | G06F 3/0656 |
| 2018/0308200 A1* | 10/2018 | Surti | G06N 3/0454 |
| 2018/0308206 A1* | 10/2018 | Surti | G06N 3/063 |
| 2019/0191373 A1* | 6/2019 | Mudulodu | H04B 1/16 |
| 2019/0243693 A1* | 8/2019 | Nakagawa | G06F 9/4843 |
| 2020/0083889 A1* | 3/2020 | Thiagarajan | H03K 19/1736 |
| 2021/0133060 A1* | 5/2021 | David | G06F 11/2082 |

\* cited by examiner

COMMUNICATION APPARATUS HAVING POWER SAVING MODE AND CAPABLE OF SAVING MORE POWER IN POWER SAVING MODE

BACKGROUND OF THE INVENTION

1. Field of the Invention

The invention relates to a communication apparatus, and more particularly to a communication apparatus having a power saving mode and capable of saving more power in the power saving mode.

2. Description of the Prior Art

Generally speaking, for a communication circuit chip (e.g. WLAN wireless network communication chip) having a power saving mode (low power consumption mode), a conventional scheme may still provide power for partial memory circuit units when the communication circuit chip has entered the power saving mode. For example, a lower supply voltage level may be provided fora static random access memory (SRAM) within the communication circuit chip wherein the SRAM for example is used for storing data information of at least one instruction to be instantly executed by a microcontroller (or control circuit) of the communication circuit chip when communication circuit chip leaves the power saving mode to go back to the normal operation mode. For the conventional scheme, if the SRAM is not supplied with power in the power saving mode, then the microcontroller cannot instantly execute the at least one instruction when communication circuit chip goes back to the normal operation mode; the performance of the communication circuit chip is significantly limited due to this. Additionally, even the conventional scheme decrease the supply voltage level to save power as far as possible, however, in the power saving mode, the power consumption of the SRAM accounts for a certain percentage (e.g. one third) of the total power consumption of current leakages of the communication circuit chip. Accordingly, the conventional power saving scheme has its limitation and it is difficult to save more power based on the conventional power saving scheme.

SUMMARY OF THE INVENTION

Therefore one of the objectives of the invention is to provide a communication apparatus having a power saving mode and capable of saving more power in the power saving mode, to solve the above-mentioned problems.

According to an embodiment, a communication apparatus is disclosed. The communication apparatus has a power saving mode and is externally coupled to a host system of an electronic device. The communication apparatus comprises an interface circuit, a memory circuit unit, and a direct memory access (DMA) module. The interface circuit is externally coupled to the host system. The memory circuit unit is coupled to the interface circuit and used for storing data information of at least one instruction to be executed by a microcontroller or a control circuit in the communication apparatus. The DMA module is coupled to the memory circuit unit and the interface circuit, and used for backing up, transferring, and saving the data information of the at least one instruction stored by the memory circuit unit into a memory of the electronic device when the communication apparatus receives a broadcast synchronization signal periodically sent from another communication device. When the communication apparatus enters the power saving mode, the memory circuit unit is powered down. When the communication apparatus leaves the power saving mode, the memory circuit unit is powered up, and the DMA module retrieves the data information of the at least one instruction from the memory of the electronic device to restore the data information of the at least one instruction into the memory circuit unit.

According to an embodiment, a communication apparatus has a power saving mode and is configured within an electronic device. The communication apparatus is externally coupled to a processor and a memory of the electronic device via a bus interface, and the communication apparatus comprises an interface circuit, a memory circuit unit, and a DMA module. The interface circuit is externally coupled to the host system. The memory circuit unit is coupled to the interface circuit and used for storing data information of at least one instruction to be executed by a microcontroller or a control circuit in the communication apparatus. The DMA module is coupled to the memory circuit unit and the interface circuit, and used for backing up, transferring, and saving the data information of the at least one instruction stored by the memory circuit unit into a memory of the electronic device when the communication apparatus receives a broadcast synchronization signal periodically sent from another communication device. When the communication apparatus enters the power saving mode, the memory circuit unit is powered down. When the communication apparatus leaves the power saving mode, the memory circuit unit is powered up, and the DMA module retrieves the data information of the at least one instruction from the memory of the electronic device to restore the data information of the at least one instruction into the memory circuit unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
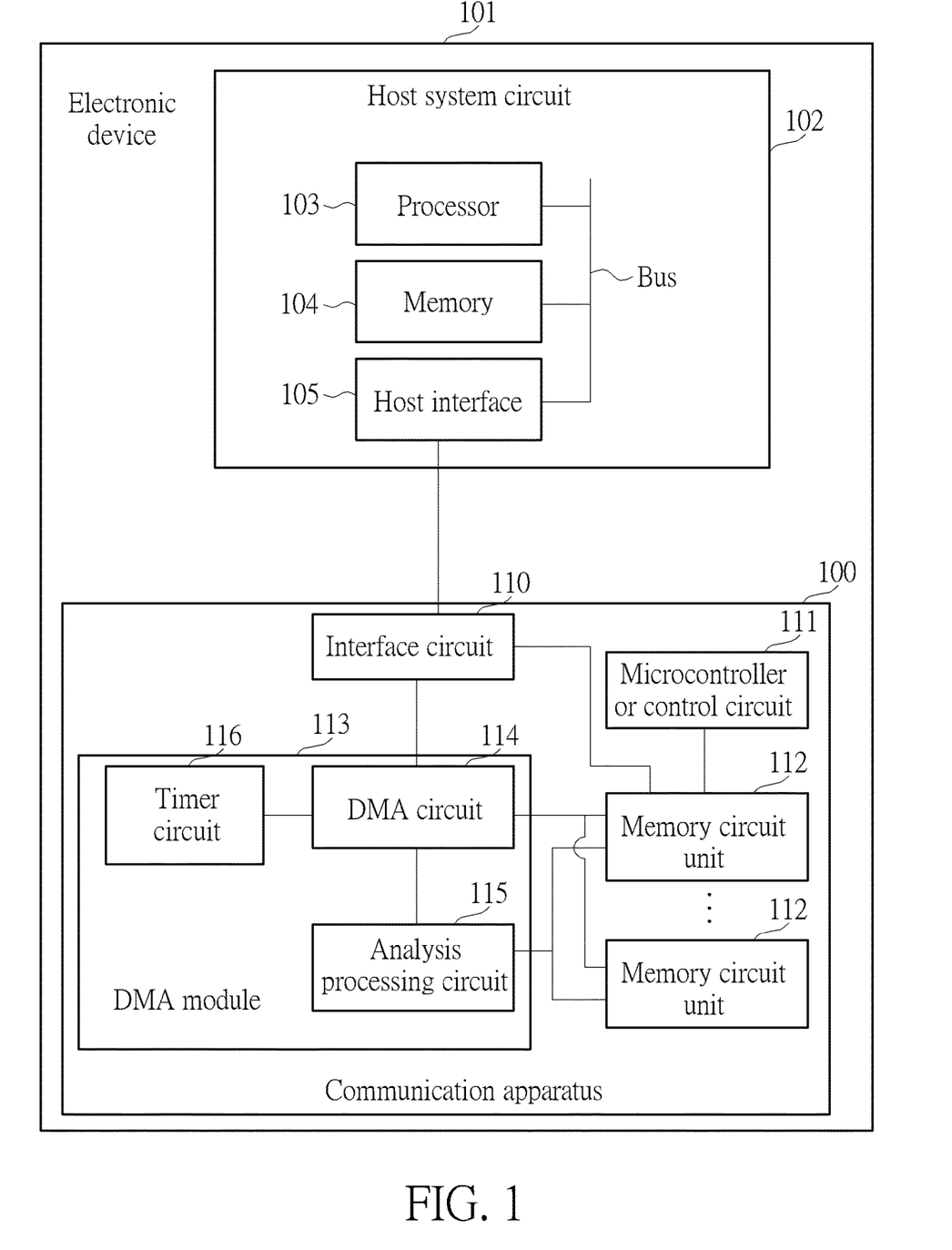
FIG. 1 is a block diagram of a communication apparatus applied into an electronic device according to an embodiment of the invention.

Please refer to FIG. 1. FIG. 1 is a block diagram of a communication apparatus 100 applied into an electronic device 101 according to an embodiment of the invention. The communication apparatus 100 has a power saving mode and is externally coupled to a host system circuit 102 of the electronic device 101. The communication apparatus 100 for example is a wireless network communication circuit chip (but not limited) and has the power saving mode such as a low power consumption mode, and the electronic device 101 may be an electronic device such as a portable electronic device, a non-portable electronic device, a phone device, or a notebook computer device (but not limited). In other words, in one embodiment, the communication apparatus 100 can be a wireless network communication circuit chip and can be configured within a phone device or a notebook computer device. As shown in FIG. 1, the communication apparatus 100 is configured within the electronic device 101 which further comprises the host system circuit 102. The host system circuit 102 for example comprises a processor 103 such as a central processing unit (CPU), a memory 104 such as dynamic random access memory (DRAM), and a host interface 105. The host system circuit 102 is coupled to the communication apparatus 100 and communicates with the communication apparatus 100 for example via an external bus, the host interface 105, and an interface circuit of the communication apparatus 100.

In practice, in an embodiment, the communication apparatus 100 for example comprises the interface circuit 110, a microcontroller (or control circuit) 111, at least one memory circuit unit 112 (one or more memory circuit units), and a direct memory access (DMA) module 113. The DMA module 113 for example comprises a DMA circuit 114, an analysis processing circuit 115, and a timer circuit 116. The at least one memory circuit unit 112 is coupled to the microcontroller (or control circuit) 111, the interface circuit 110, and the DMA module 113. The at least one memory circuit unit 112 for example is at least one static random access memory (SRAM), at least one register circuit, at least one content addressable memory and/or at least one flip-flop. The at least one memory circuit unit 112 is used for storing or temporarily storing data information and/or value(s) of at least one instruction which is executed or is to be executed by the microcontroller (or control circuit) 111.

For example, the at least one memory circuit unit 112 comprises the SRAMs, multiple register circuits, multiple content addressable memories and/or multiple flip-flops. When entering a power saving mode, in order to save power, the conventional scheme is arranged to decrease or lower the supply voltage level provided for the SRAMs, multiple register circuits, multiple content addressable memories and/or multiple flip-flops. However, such conventional scheme cannot effectively save more power since more leakage currents are still generated. The invention is to turn off (or power off) the SRAM's storage area(s) which can be powered off/down, the register circuit(s) which can be powered off/down, the content addressable memory(s) which can be powered off/down, and/or the flip-flop(s) which can be powered off/down within the communication apparatus 100 in the power saving mode, not to provide power for some partial circuits which are not needed to be powered up in the power saving mode, so as to directly avoid generating leakage currents. For example, the storage area(s), register circuit(s), content addressable memory(s) and/or flip-flop(s), which cannot be powered down in the power saving mode, for example is/are used to store information of the next timing to be waken up and other parameters or values to be used in the power saving mode. The other storage area(s), register circuit(s), content addressable memory(s) and/or flip-flop(s), which are used for storing data or values that are not used in the power saving mode, can be classified into one or more circuit units which can be powered down. For example, for an SRAM having the capacity size of 96 KB (but not limited), the invention can be arranged to provide power for only the storage area having the capacity size of 16 KB or 32 KB (but not limited) in the SRAM (even there is no power supply for Any SRAM block in some cases) and to power down the other storage areas, to save more power. Additionally, for the register circuits, content addressable memories and/or flip-flops, the invention can be arranged to reduce the number of register circuits, content addressable memories and/or flip-flops which are needed to powered up in the power saving mode as far as possible, to save more power.

In practice, the DMA module 113 is used to backup, transfer/transmit, and save (write) the data information of at least one instruction stored by the at least one memory circuit unit 112 into the memory 104 of the electronic device 101 when the communication apparatus 100 receives a broadcast synchronization signal periodically sent from another communication apparatus. When the communication apparatus 100 enters the power saving mode, the at least one memory circuit unit 112 is powered down. When the communication apparatus 100 leaves the power saving mode, the at least one memory circuit unit 112 is powered up, and the DMA module 113 retrieves the data information of the at least one instruction from the memory 104 of the electronic device 101 and then restores such retrieved data information into the at least one memory circuit unit 112. Thus, when the communication apparatus 100 enters the power saving mode, the size(s) of storage area(s) of the SRAM and the number of register circuit(s), content addressable memory(s) and/or flip-flop(s), which is/are actually needed to be powered up, can be reduced or decreased as far as possible. In other words, the SRAM's storage area(s), register circuit(s), content addressable memory(s) and/or flip-flop(s) which is/are not needed to be used during the power saving mode can be powered down/off. Only the SRAM's other storage area(s), register circuit(s), content addressable memory(s) and/or flip-flop(s) which is/are needed to be used during the power saving mode is/are powered up. In order to achieve the power saving objectives and the capability of fast data recovering to obtain the content information correspondingly stored in the SRAM's storage area(s), register circuit(s), content addressable memory(s), and/or flip-flop(s) which is/are powered down during the power saving mode, the invention employs the DMA operation scheme to rapidly, periodically, or for single one time backup the content data and periodically perform data recovery to restore the content data.

Taking a wireless network communication circuit chip as an example of the communication apparatus 100 for illustrative, the above-mentioned another communication apparatus means a wireless access point which is arranged to periodically send a broadcast synchronization signal to all wireless network communication circuits within its coverage range to achieve the synchronization for all the wireless network communication circuits. The broadcast synchronization signal for example is a beacon packet which is followed by a data transmission interval of the wireless access point during which the wireless access point is arranged to transmit data packet(s). Since the beacon packet may carry different information for different wireless network communication circuits, a wireless network communication circuit therefore needs to periodically wake, listen, and monitor the beacon packet to determine whether one or more data packets will be transmitted to the wireless network communication circuit during a following data transmission interval if such wireless network communication circuit enters the power saving mode. If it is determined that some data packet(s) will be transmitted, then the wireless network communication circuit is awake during the following data transmission interval and does not enter the power saving mode. Instead, if it is determined that no data packets will be transmitted, then the wireless network communication circuit sleeps and enters the power saving mode during the following data transmission interval. In this situation, if some data packets, to be transmitted to the wireless network communication circuit, occur at the wireless access point, then the wireless access point is arranged to queue the data packets and wait for a next data transmission interval wherein the data packets will be transmitted to the wireless network communication circuit during the next data transmission interval.

Figure 2:
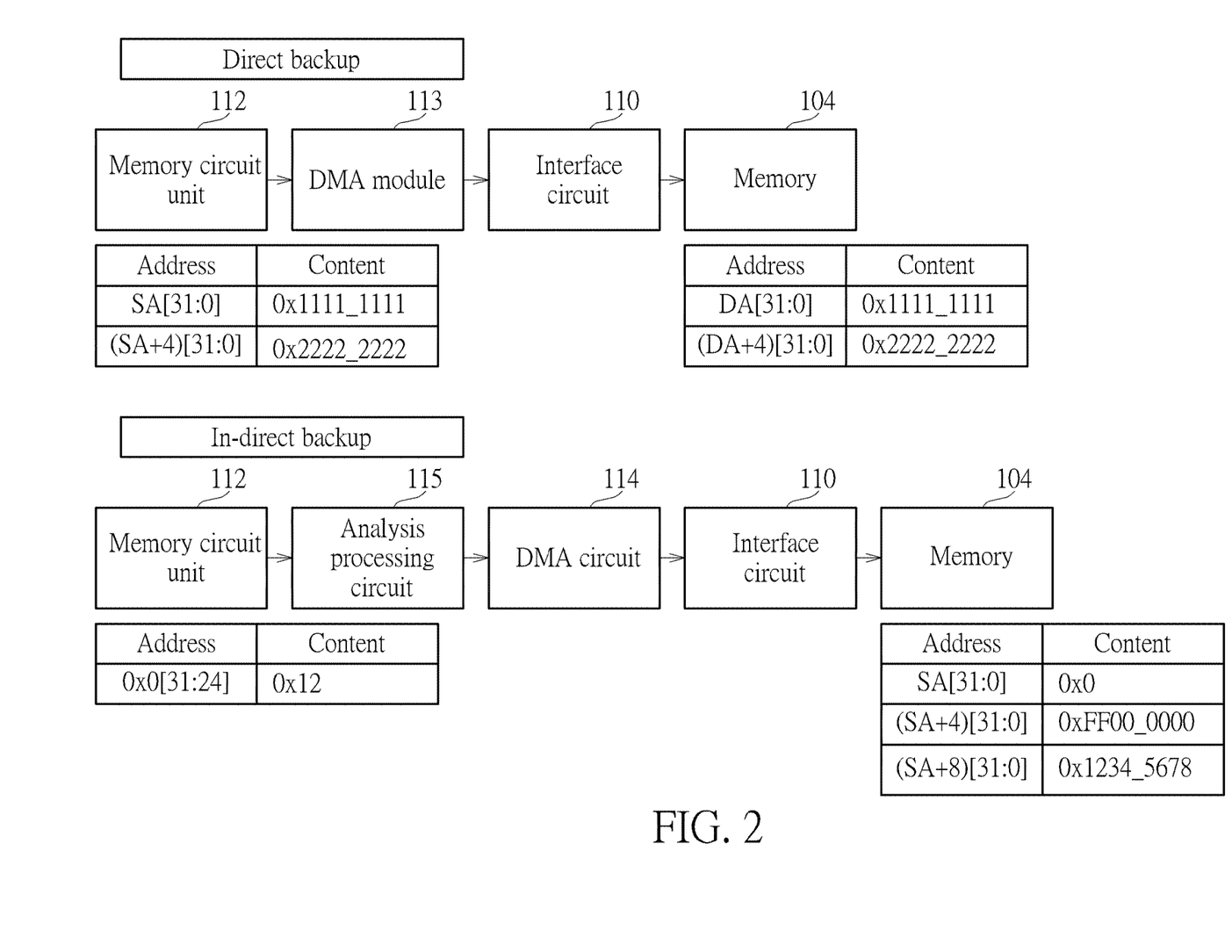
FIG. 2 is a diagram of the operations of DMA module as shown in FIG. 1 to backup, transfer, and save the content information stored by the at least one memory circuit unit into the memory of the electronic device according to an embodiment of the invention.
Figure 3:
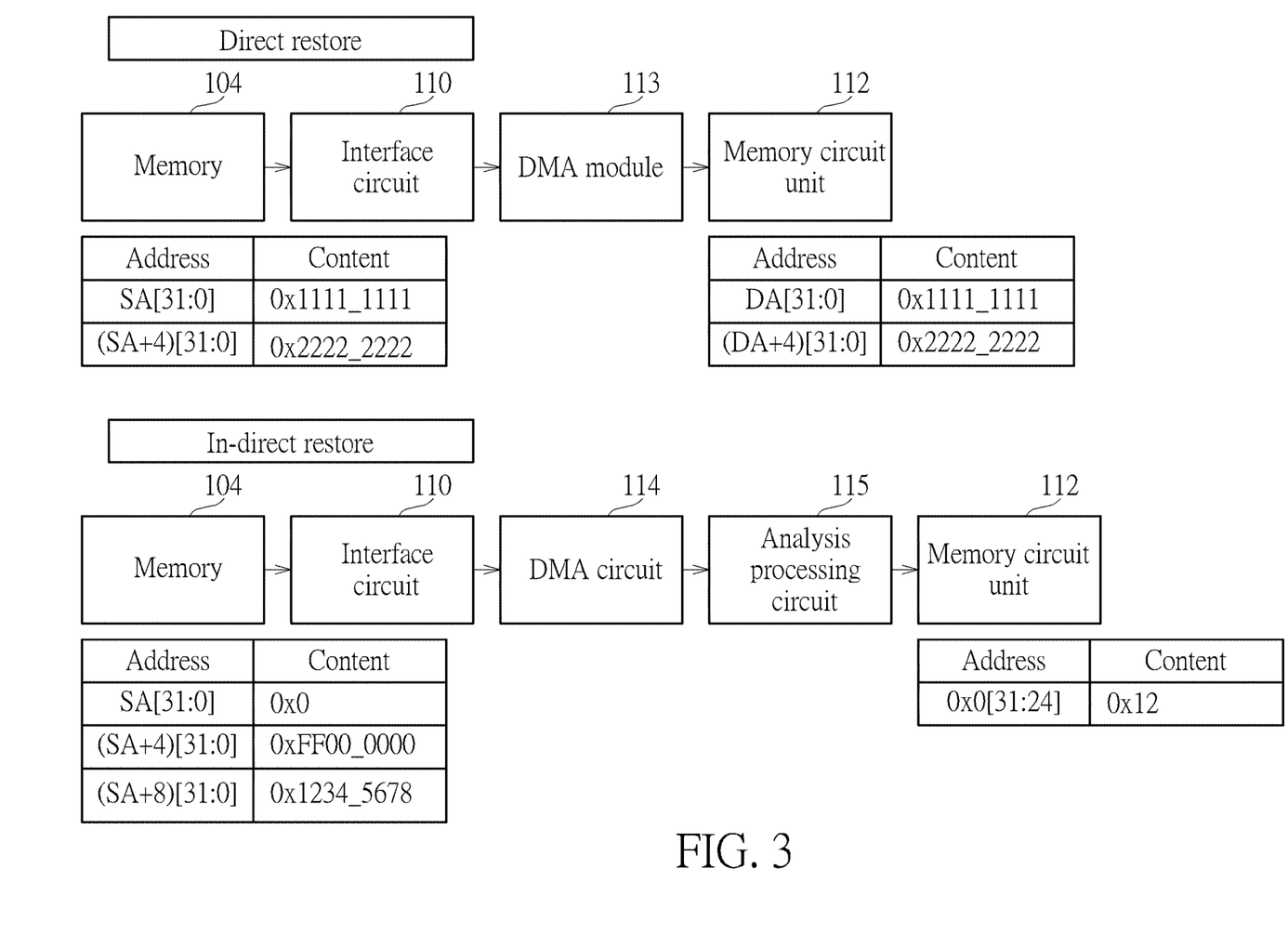
FIG. 3 is a diagram of the operations of DMA module as shown in FIG. 1 to perform data recovery to restore data from the memory of the electronic device into the at least one memory circuit unit according to an embodiment of the invention.

Further, in one embodiment, the above-mentioned DMA operation may comprises two DMA modes wherein a first DMA mode is to sequentially backup and restore the content data in accordance with the order of addresses while a second DMA mode can backup only a portion of data content and perform corresponding data recovery to restore the corresponding portion of data content. Please refer to FIG. 2 in conjunction with FIG. 3. FIG. 2 is a diagram of the operations of DMA module 113 as shown in FIG. 1 to backup, transfer, and save the content information stored by the at least one memory circuit unit 112 into the memory 104 of the electronic device 101 according to an embodiment of the invention. FIG. 3 is a diagram of the operations of DMA module 113 as shown in FIG. 1 to perform data recovery to restore data from the memory 104 of the electronic device 101 into the at least one memory circuit unit 112 according to an embodiment of the invention.

As shown in FIG. 2, taking an example of the first DMA mode to perform sequential and direct backup operation, the analysis processing circuit 115 of the DMA module 113 for example is used for sequentially backing up, transferring, and saving one or more corresponding content data corresponding to one or more first addresses of the at least one memory circuit unit 112 into the DMA circuit 114 in accordance with the order of the one or more first addresses. The DMA circuit 114 is used for storing the one or more corresponding content data into one or more second addresses of the memory 104 through a DMA operation according to the order of the one or more second addresses of the memory 104 of the electronic device 101. For example, a memory circuit unit 112 is arranged to use two consecutive first addresses, i.e. SA[31:0] and (SA+4) [31:0], to store two corresponding content information, i.e. 0x1111_1111 and 0x2222_2222. The analysis processing circuit 115 is arranged to retrieve the data content 0x1111_1111 and 0x2222_2222 and transfer and save the retrieved data content into the DMA circuit 114 in accordance with the order of the addresses SA[31:0] and (SA+4) [31:0]. The DMA circuit 114 is arranged to write the two data content information into two consecutive second addresses of the memory 104, i.e. DA[31:0] and (DA+4) [31:0]. [31:0] means that the address length is equal to 32 bits, i.e. 4 bytes, (but not limited), and thus SA+4 and DA+4 are respectively used to indicate the next addresses for the addresses SA and DA.

Taking an example of the second DMA mode to perform in-direct backup operation, the analysis processing circuit 115 is used for generating at least one bit mask information and at least one content information to be saved according to the at least one first address information and the at least one corresponding content information when the communication apparatus 100 receives the beacon packet periodically sent from the wireless access point. The DMA circuit 114 is used for storing the at least one first address information, the at least one bit mask information, and the at least one content information to be saved into at least one set of second addresses of the dynamic random access memory 104 of the electronic device 101 via the interface circuit 110 through the DMA operation wherein each set of second addresses comprise three consecutive addresses. For example, as shown in the example of FIG. 2, partial bits, i.e. 0x0 [31:24], of the first address 0x0 of the memory circuit unit records corresponding content information, i.e. 0x12, and the other bits of the address 0x0 do not record content information. The analysis processing circuit 115 of the DMA module 113 for example is arranged for analyzing the partial bits 0x0 [31:24] of the first address 0x0 and the corresponding content information 0x12 to generate a bit mask information 0xFF00_0000 and content information to be saved such as 0x1234_5678 (but not limited, which can also be 0x1200_0000). The bit mask information 0xFF00_0000 indicates that only a portion (i.e. 8 higher bits) of the address 0x0 records corresponding content information and the other bits do not record content information. The analysis processing circuit 115 is arranged for transmitting the first address 0x0, the generated bit mask information 0xFF00_0000, and the content information to be saved such as 0x1234_5678 to the DMA circuit 114. The DMA circuit 114 is arranged for sequentially storing the three data into a storage space, which has three consecutive second addresses, within the memory 104 of the electronic device 100; the three consecutive second addresses for example are DA[31:0], (DA+4) [31:0], and (DA+8) [31:0]. That is, the operation executed by the DMA circuit 114 is to store different received input data into the memory 104 of the electronic device 100 sequentially through the DMA operation in accordance with the order of the different received input data.

As shown in FIG. 3, when the communication apparatus 100 determines to leave the power saving mode, the memory circuit unit(s) 112 is/are powered up at first and the data recovery can be performed to restore corresponding content data into the memory circuit unit(s) 112, and then the communication apparatus 100 leaves the power saving mode to enter the normal operation mode. Thus, the microcontroller (or control circuit) 111 in the normal operation mode can correctly read data information of at least one instruction stored by the memory circuit unit(s) 112 to perform corresponding operation(s) or calculation(s). Correspondingly, the operations of data recovery to restore content data of the memory circuit unit(s) comprise two modes, i.e. sequential and direct data recovery mode and in-direct data recovery mode.

For example, taking an example of sequential and direct data recovery mode in FIG. 3, the DMA circuit 114 uses the DMA operation to read and obtain the content data 0x1111_1111 and 0x2222_2222 from two consecutive second addresses of the memory 104, i.e. DA [31:0] and (DA+4) [31:0], and then transmits the two content data to the analysis processing circuit 115. The analysis processing circuit 115 then transmits and stores the two content data to two first addresses of the memory circuit unit 112, i.e.

SA[31:0] and (SA+4) [31:0]. Accordingly, after restoring one or more content data, the microcontroller (or control circuit) 111 can retrieve and obtain data information of at least one instruction from one or more first addresses to perform the operation(s) of the at least one instruction.

Additionally, taking an example of in-direct data recovery mode in FIG. 3, the DMA circuit 114 uses the DMA operation to read and obtain the first address 0×0, the bit mask information 0×FF00_0000 previously backed up, and the content information to be saved such as 0×1234_5678 from a set of three consecutive second addresses in the memory 104, e.g. DA [31:0], (DA+4) [31:0], and (DA+8) [31:0], and then transmits the read content data into the analysis processing circuit 115. The analysis processing circuit 115 based on the read content data can parse the bit mask information 0×FF00_0000 to obtain that only a portion (e.g. 0×12) of the content information to be saved (e.g. 0×1234_5678) is to be saved and to obtain that the portion of information is the information which is stored by some partial bits (i.e. 0×0[31:24]) of the first address 0×0. Then the analysis processing circuit 115 writes the data 0×12 into a storage area defined by the partial bits (i.e. 0×0[31:24]) of the first address 0×0, to correctly restore the content data. Thus, after the content data has been restored, the microcontroller (or control circuit) 111 can retrieve data information of at least one instruction based on the partial addresses of one or more first addresses to perform the operation(s) of the at least one instruction.

Figure 4:
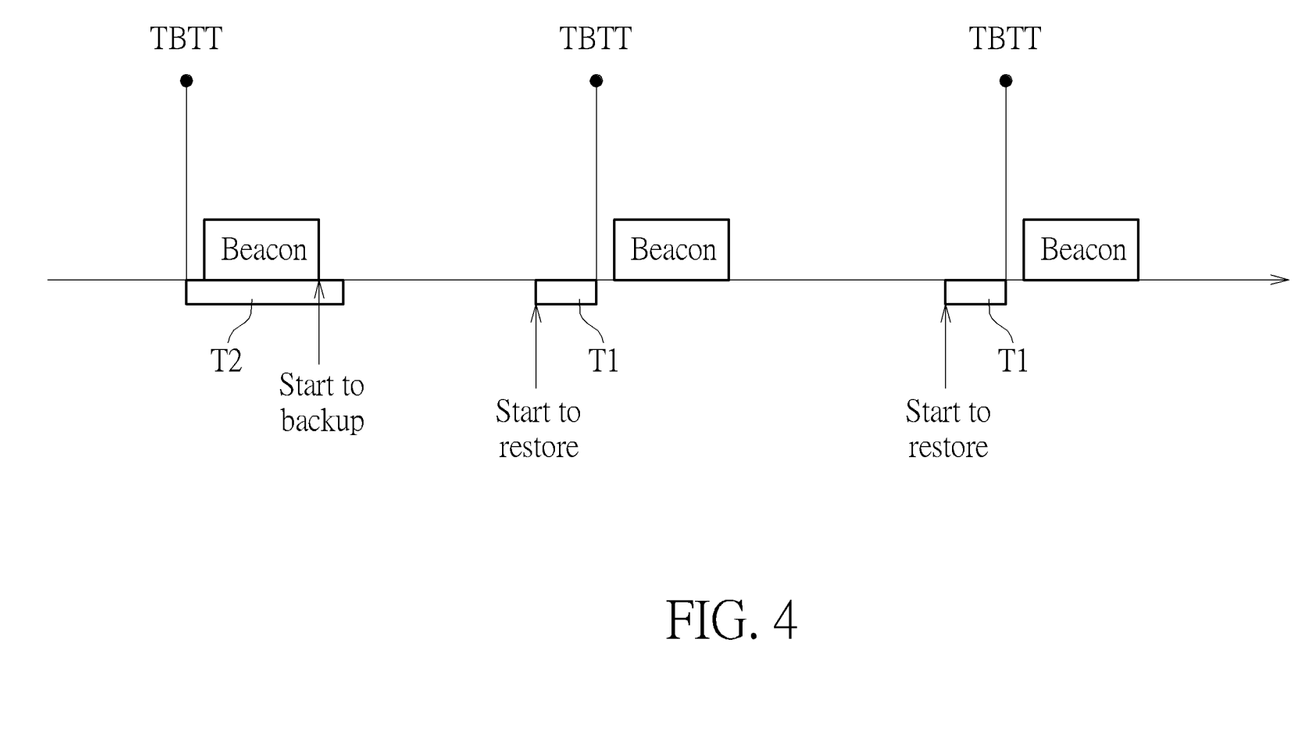
FIG. 4 is a timing diagram of the operation configured to backup, transfer, and save content data and the operation configured to restore content data according to an embodiment of the invention.

Additionally, refer to FIG. 4. FIG. 4 is a timing diagram of the operation configured to backup, transfer, and save content data and the operation configured to restore content data according to an embodiment of the invention. As shown in FIG. 4, when backing up, transferring, and saving content data, the DMA module 113 can select and perform a single one time backup with periodic data restore operation. The clock signal used to backup data and/or restore data can be provided by the timer circuit 116 to trigger the DMA module 113. The timer circuit 116 is arranged for generating a trigger signal according to a time interval of the beacon packet periodically sent from the wireless access point to trigger the DMA module 113 to activate the DMA operation of the DMA circuit 114, periodically or for only one time. For example, as shown in FIG. 4, TBTT is the target beacon transmission time which indicates a start time of each beacon packet which is periodically broadcasted. For example, for a second time interval T2 following the first target beacon transmission time TBTT as shown in FIG. 4, the second time interval T2 at least covers transmission and reception of one beacon packet. For backing up content data for single one time, the DMA module 113 can be arranged to backup, transfer, and save content data at the following timings: when the software or firmware configuration is set as trigger instantly, when the beacon packet is received, or when the beacon packet has not been received but the second time interval T2 ends, and so on. The DMA module 114 does not perform the operations of backing up, transferring, and saving data after receiving the other following/next target beacon transmission times TBTT, different from the first TBTT. For example, when the second time interval T2 starts, the communication apparatus 100 starts to receive the beacon packet transmitted from the wireless access point to determine whether to enter the power saving mode in the following transmission time or not. If it is determined to enter the power saving mode (i.e. the communication apparatus 100 determines that no data packets are transmitted from the wireless access point), then the DMA module 113 starts the operations of backing up, transferring, and saving content data to use the DMA operation to rapidly backup, transfer, and save the data information of the at least one instruction recorded by the memory circuit unit(s) 112 into the memory 104 of the electronic device 101 when the end of the transmission of a beacon (but not limited) and/or when the communication apparatus 100 enters the power saving mode. Then, the memory circuit unit(s) 112 is/are powered down, to save more power. Thus, when periodically restoring the content data, the DMA module 113 is arrange to read the same data copy (i.e. the data which is backed up, transferred, and saved for the first time) from the memory 104 to periodically restore, generate, and save the data information into the memory circuit unit(s) 112. The data information recorded in the memory circuit unit(s) 112 is/are the same copy and thus is/are identical. For example, for a first time interval T1 followed by the second target beacon transmission time TBTT in FIG. 4, when the first time interval T1 starts, the communication apparatus 100 starts to leave the power saving mode, and the memory circuit unit(s) 112 is/are powered up. In this situation, the DMA module 113 starts to perform data recovery to restore the content data by using the DMA operation to rapidly read and obtain the data, which is previously backed up, from the memory 104 of the electronic device 101 and then to restore data from the data previously backed up into the memory circuit unit(s) 112 so that the memory circuit unit(s) 112 record(s) the data information of the at least one instruction.

Figure 5:
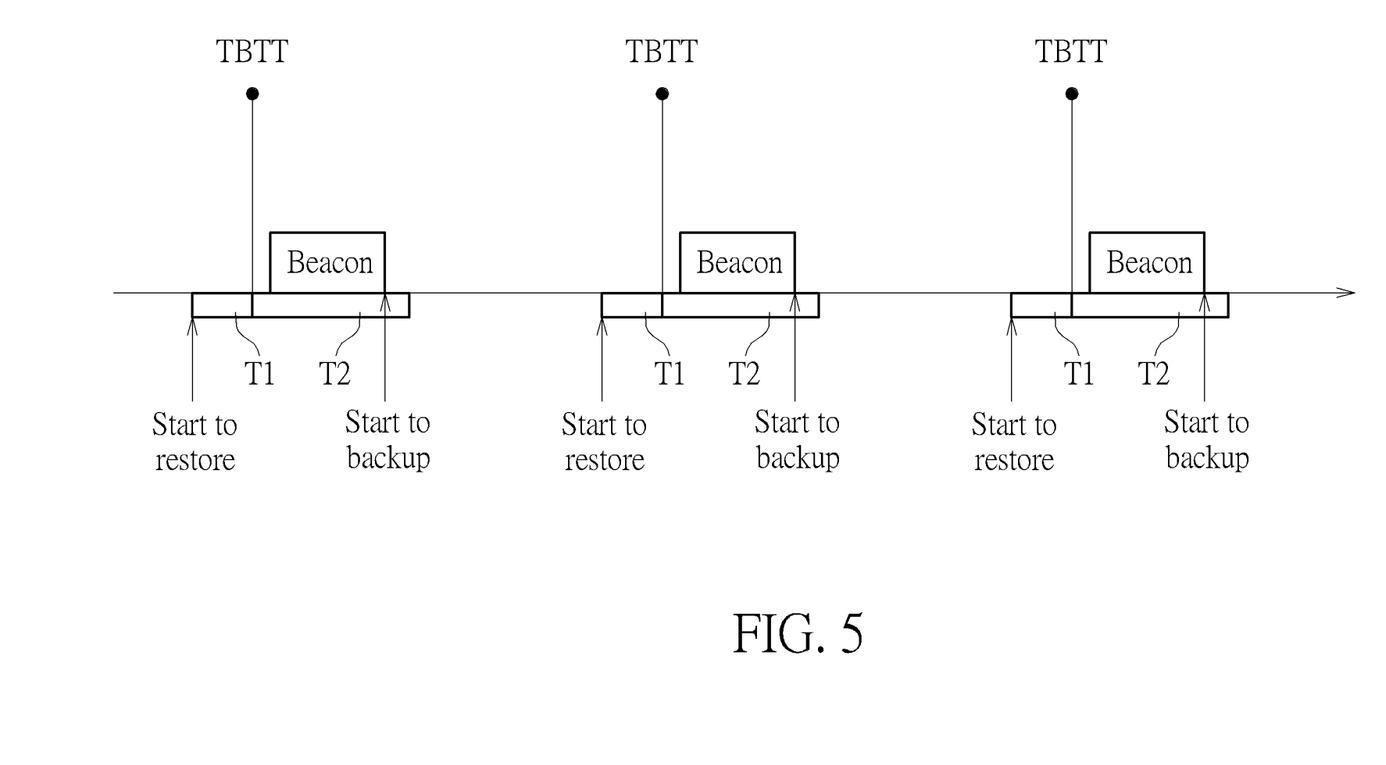
FIG. 5 is a timing diagram of the operation configured to backup, transfer, and save content data and the operation configured to restore content data according to another embodiment of the invention.

Further, refer to FIG. 5. FIG. 5 is a timing diagram of the operation configured to backup, transfer, and save content data and the operation configured to restore content data according to another embodiment of the invention. As shown in FIG. 5, for the example of the DMA module 113 periodically backing up content data, when each of the first time intervals T1 starts, the communication apparatus 100 starts to leave the power saving mode and the memory circuit unit(s) 112 is/are power up. The DMA module 113 starts to perform a content data recovery operation by using the DMA operation to rapidly read and obtain the data, which is previously backed up, from the memory 104 of the electronic device 101 and then restore data from the data previously backed up into the memory circuit unit(s) 112 so that the memory circuit unit(s) 112 can record the data information of the at least one instruction. For each second time interval T1 following each target beacon transmission time TBTT, when each second time interval T2 starts, the communication apparatus 100 starts to receive the beacon packet sent from the wireless access point to determine whether to enter the power saving mode or not in the following transmission time. If it is determined to enter the power saving mode (i.e. the communication apparatus 100 determines that no data packets are transmitted from the wireless access point), then the DMA module 113 starts to backup, transfer, and save the content data by using the DMA operation to rapidly backup, transfer, and save the data information of the at least one instruction recorded by the memory circuit unit(s) 112 into the memory 104 of the electronic device 101 when the reception of the beacon packet ends and/or the communication apparatus 100 enters the power saving mode again. Then, the memory circuit unit(s) 112 can be powered down/off, to save more power. In other words, for periodically backing up data, the DMA module 113 is arranged to backup, transfer, and save content data during each second time interval T2 following each target beacon transmission time TBTT. Thus, when periodically performing the content data recovery operation, the DMA module 113 is arranged to read and obtain the data, which is the last backed up, transferred, and saved, to restore the data information from the last backed up data into the memory circuit unit(s) 112 periodically. Accordingly, the data information currently recorded by the memory circuit unit(s) 112 may be different from the last stored content information.

Figure 6:
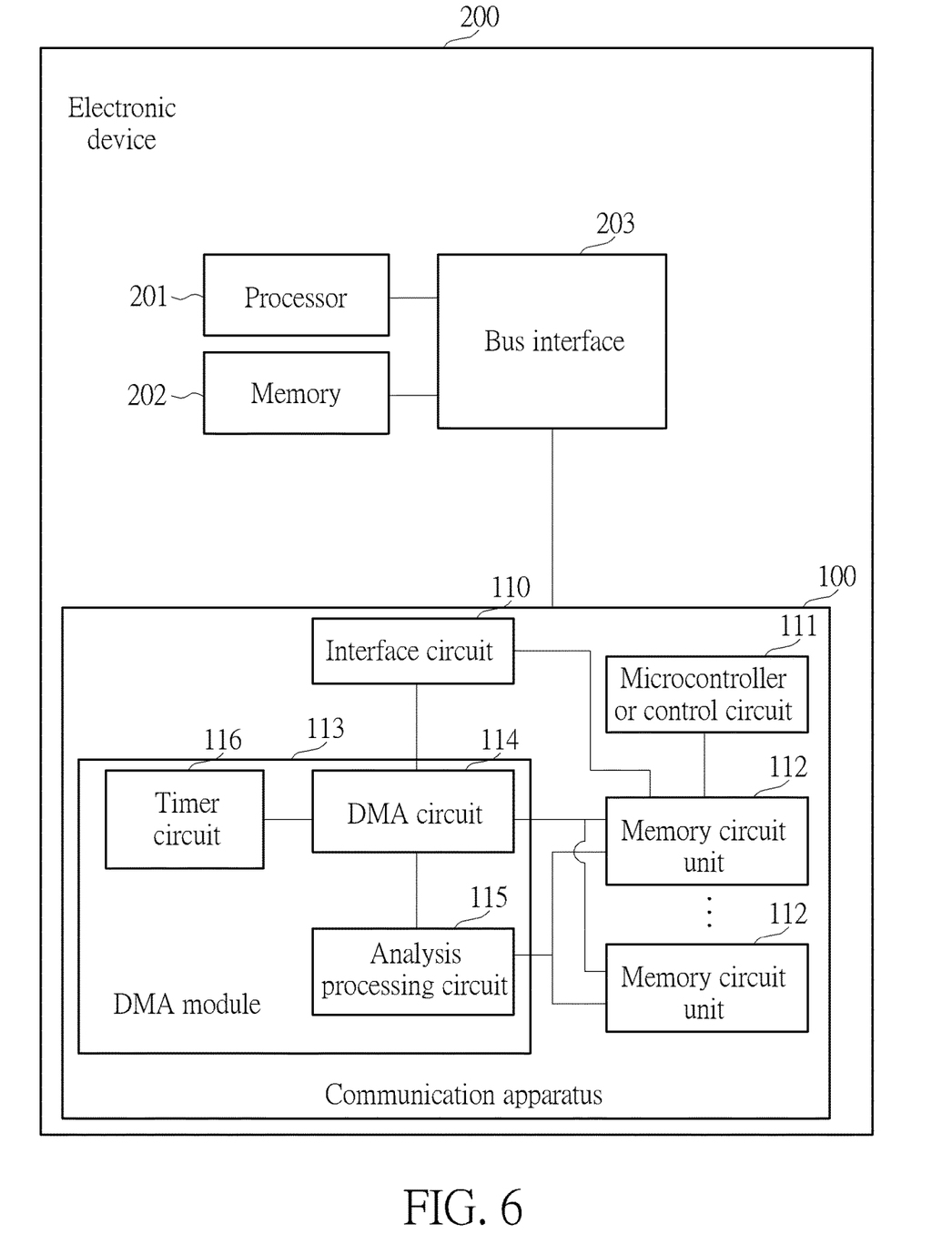
FIG. 6 is a block diagram of a communication apparatus applied into an electronic device according to another embodiment of the invention.

Further, a communication apparatus for example can be configured within an embedded system circuit, and the content data backing up and recovery can be used to backup and save the information from the memory circuit unit(s) of the communication apparatus into a memory of the embedded system circuit and restore data from the memory of the embedded system circuit into the memory circuit unit(s) of the communication apparatus, respectively. Please refer to FIG. 6. FIG. 6 is a block diagram of a communication apparatus 100 applied into an electronic device 200 according to another embodiment of the invention. The communication apparatus 100 is configured within the electronic device 200 such as an embedded system circuit, and the communication apparatus 100 is externally coupled to the processor 201 and memory 202 of the electronic device 200 via the bus circuit 203; other operations and functions are identical to those described in the above paragraphs, and are not detailed again for brevity.

Further, for the embodiment supporting only the direct backing up and recovering content data, the analysis processing circuit 115 in FIG. 1 is optional. For example, in one embodiment, the DMA module 113 can exclude the analysis processing circuit 115, and the one or more memory circuit units 112 are coupled to the DMA circuit 114 which is used to perform the operations of direct backing up and recovering content data without using the analysis processing circuit 115 to transmit data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus having a power saving mode and to be externally coupled to a host system of an electronic device, comprising:
   an interface circuit, externally coupled to the host system;
   a memory circuit unit, coupled to the interface circuit, for storing data information of at least one instruction to be executed by a microcontroller or a control circuit in the communication apparatus; and
   a direct memory access (DMA) module, coupled to the memory circuit unit and the interface circuit, for backing up, transferring, and saving the data information of the at least one instruction stored by the memory circuit unit into a memory of the electronic device when the communication apparatus receives a broadcast synchronization signal periodically sent from another communication device;
   wherein when the communication apparatus enters the power saving mode, the memory circuit unit is powered down; when the communication apparatus leaves the power saving mode, the memory circuit unit is powered up, and the DMA module retrieves the data information of the at least one instruction from the memory of the electronic device to restore the data information of the at least one instruction into the memory circuit unit; the communication apparatus is a wireless network communication circuit, the another communication apparatus is a wireless access point, and the broadcast synchronization signal is a beacon packet the data information of the at least one instruction comprises at least one corresponding content information which is stored into at least one first address, and the DMA module comprises:
   an analysis processing circuit, for generating at least one bit mask information and at least one content information to be saved according to the at least one first address and the at least one corresponding content information when the communication apparatus receives the beacon packet periodically sent from the wireless access point; and
   a DMA circuit, coupled to the analysis processing circuit, for using a DMA operation to and the interface circuit to store the at least one first address, the at least one bit mask information, and the at least one content information to be saved into at least one set of second addresses of a memory of the electronic device, each set of second addresses comprises three consecutive addresses.

2. The communication apparatus of claim 1, wherein the memory circuit unit comprises at least one of a static random access memory, a register circuit, a content addressable memory, and a flip-flop.

3. The communication apparatus of claim 1, wherein when the communication apparatus receives the beacon packet periodically sent from the wireless access point, the DMA module is arranged use a DMA operation to backup the at least one corresponding content information stored by the memory circuit unit and use the interface circuit to sequentially transfer and save the at least one corresponding content information into at least one second address of a memory of the electronic device according to the at least one first address.

4. The communication apparatus of claim 3, wherein when the communication apparatus leaves the power saving mode, the DMA module is arranged to use the DMA operation to retrieve and restore the at least one corresponding content information from the memory of the electronic device into the memory circuit unit.

5. The communication apparatus of claim 1, wherein when the communication apparatus leaves the power saving mode, the analysis processing circuit is arranged to retrieve and parse the at least one first address, the at least one bit mask information, and the at least one content information to be saved from the at least one set of second addresses of the memory of the electronic device to generate the at least one first address and the at least one corresponding content information, and the DMA circuit is arranged to use the DMA operation to restore the at least one corresponding content information into the at least one first address of the memory circuit unit.

6. The communication apparatus of claim 1, wherein the DMA module further comprises:
   a timer circuit, coupled to the DMA circuit, for generating a trigger signal to the DMA module periodically or for only one time according to a time interval of the beacon packet periodically sent from the wireless access point, to activate the DMA operation of the DMA circuit.

7. The communication apparatus of claim 1, wherein the DMA module is arranged to automatically backup, transfer, and save the data information of the at least one instruction stored by the memory circuit unit into the memory of the electronic device and retrieve and restore the data information of the at least one instruction from the memory of the electronic device into the memory circuit unit according to at least one trigger event.

8. A communication apparatus having a power saving mode and to be configured within an electronic device, the communication apparatus to be externally coupled to a processor and a memory of the electronic device via a bus interface, and the communication apparatus comprises:
- an interface circuit, externally coupled to the processor and the memory of the electronic device via the bus interface;
- a memory circuit unit, coupled to the interface circuit, for storing data information of at least one instruction to be executed by a microcontroller (or control circuit) of the communication apparatus; and
- a direct memory access (DMA) module, coupled to the memory circuit unit and the interface circuit, for backing up, transferring, and saving the data information of the at least one instruction stored by the memory circuit unit into the memory of the electronic device when the communication apparatus receives a broadcast synchronization signal periodically sent from another communication device;
- wherein when the communication apparatus enters the power saving mode, the memory circuit unit is powered down; when the communication apparatus leaves the power saving mode, the memory circuit unit is powered up, and the DMA module retrieves the data information of the at least one instruction from the memory of the electronic device to restore the data information of the at least one instruction into the memory circuit unit; the communication apparatus is a wireless network communication circuit, the another communication apparatus is a wireless access point, and the broadcast synchronization signal is a beacon packet the data information of the at least one instruction comprises at least one corresponding content information which is stored into at least one first address, and the DMA module comprises:
  - an analysis processing circuit, for generating at least one bit mask information and at least one content information to be saved according to the at least one first address and the at least one corresponding content information when the communication apparatus receives the beacon packet periodically sent from the wireless access point; and
- a DMA circuit, coupled to the analysis processing circuit, for using a DMA operation to and the interface circuit to store the at least one first address, the at least one bit mask information, and the at least one content information to be saved into at least one set of second addresses of a memory of the electronic device, each set of second addresses comprises three consecutive addresses.

9. The communication apparatus of claim 8, wherein the memory circuit unit comprises at least one of a static random access memory, a register circuit, a content addressable memory, and a flip-flop.

10. The communication apparatus of claim 8, wherein when the communication apparatus receives the beacon packet periodically sent from the wireless access point, the DMA module is arranged use a DMA operation to backup the at least one corresponding content information stored by the memory circuit unit and use the interface circuit to sequentially transfer and save the at least one corresponding content information into at least one second address of a memory of the electronic device according to the at least one first address.

11. The communication apparatus of claim 10, wherein when the communication apparatus leaves the power saving mode, the DMA module is arranged to use the DMA operation to retrieve and restore the at least one corresponding content information from the memory of the electronic device into the memory circuit unit.

12. The communication apparatus of claim 8, wherein when the communication apparatus leaves the power saving mode, the analysis processing circuit is arranged to retrieve and parse the at least one first address, the at least one bit mask information, and the at least one content information to be saved from the at least one set of second addresses of the dynamic random access memory of the electronic device to generate the at least one first address and the at least one corresponding content information, and the DMA circuit is arranged to use the DMA operation to restore the at least one corresponding content information into the at least one first address of the memory circuit unit.

13. The communication apparatus of claim 8, wherein the DMA module further comprises:
- a timer circuit, coupled to the DMA circuit, for generating a trigger signal to the DMA module periodically or for only one time according to a time interval of the beacon packet periodically sent from the wireless access point, to activate the DMA operation of the DMA circuit.

14. The communication apparatus of claim 8, wherein the DMA module is arranged to automatically backup, transfer, and save the data information of the at least one instruction stored by the memory circuit unit into the memory of the electronic device and retrieve and restore the data information of the at least one instruction from the memory of the electronic device into the memory circuit unit according to at least one trigger event.

* * * * *